Sept. 28, 1965      I. M. WHITE      3,208,718
SPHERICAL VALVE
Filed March 15, 1963      3 Sheets-Sheet 1
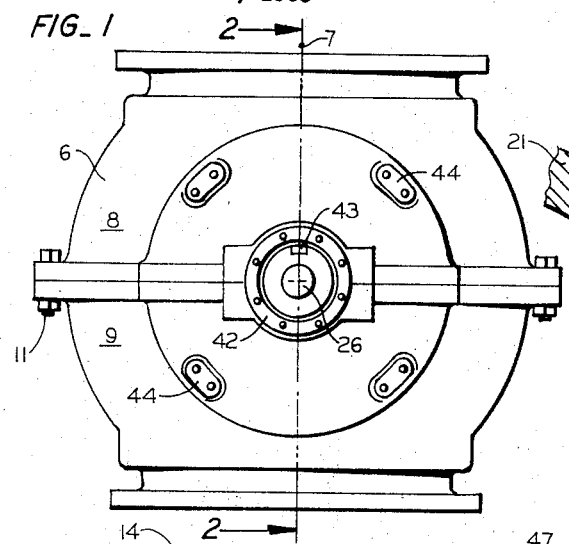
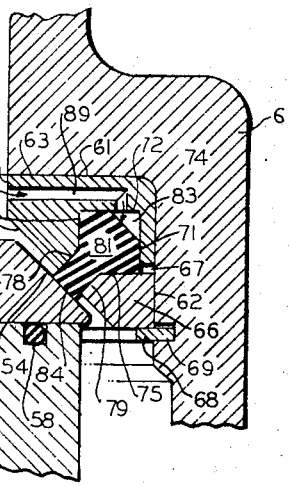
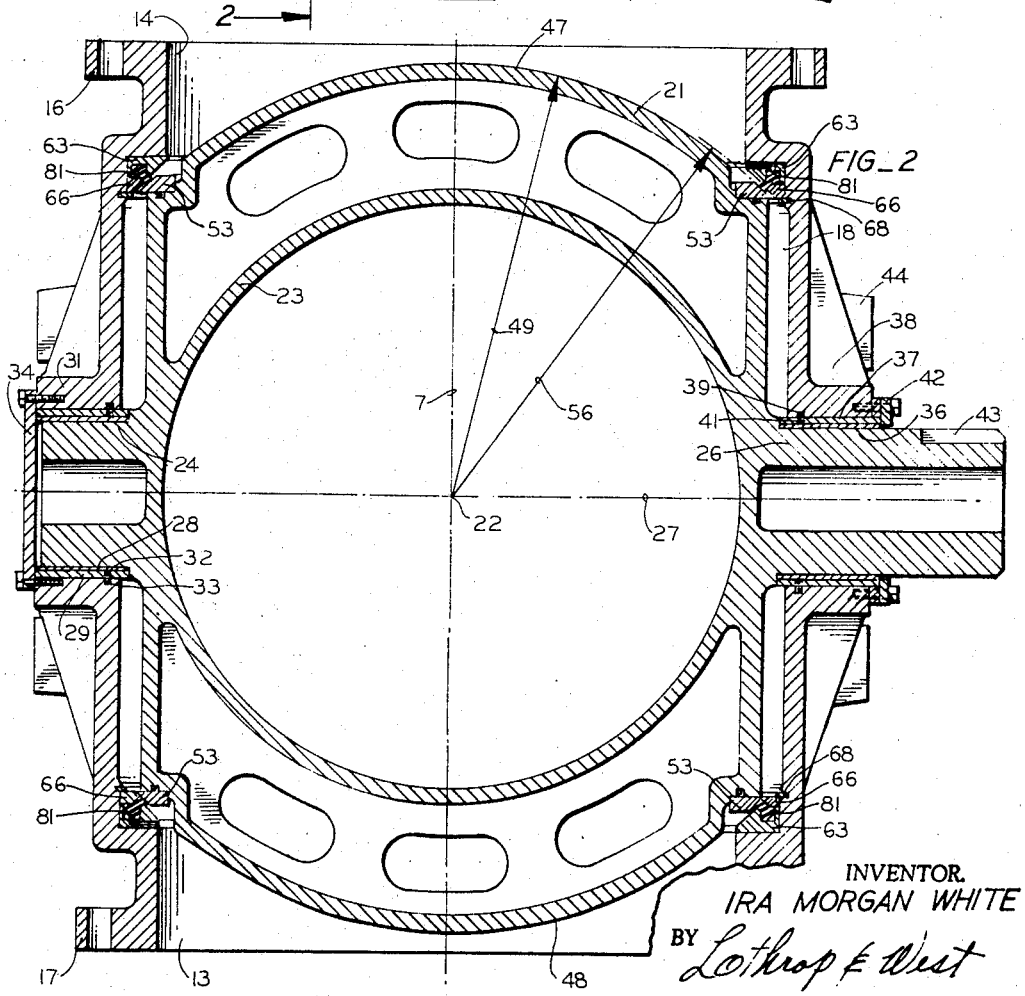
INVENTOR.
IRA MORGAN WHITE
BY Lothrop & West
ATTORNEYS Sept. 28, 1965  I. M. WHITE  3,208,718
SPHERICAL VALVE
Filed March 15, 1963  3 Sheets-Sheet 2
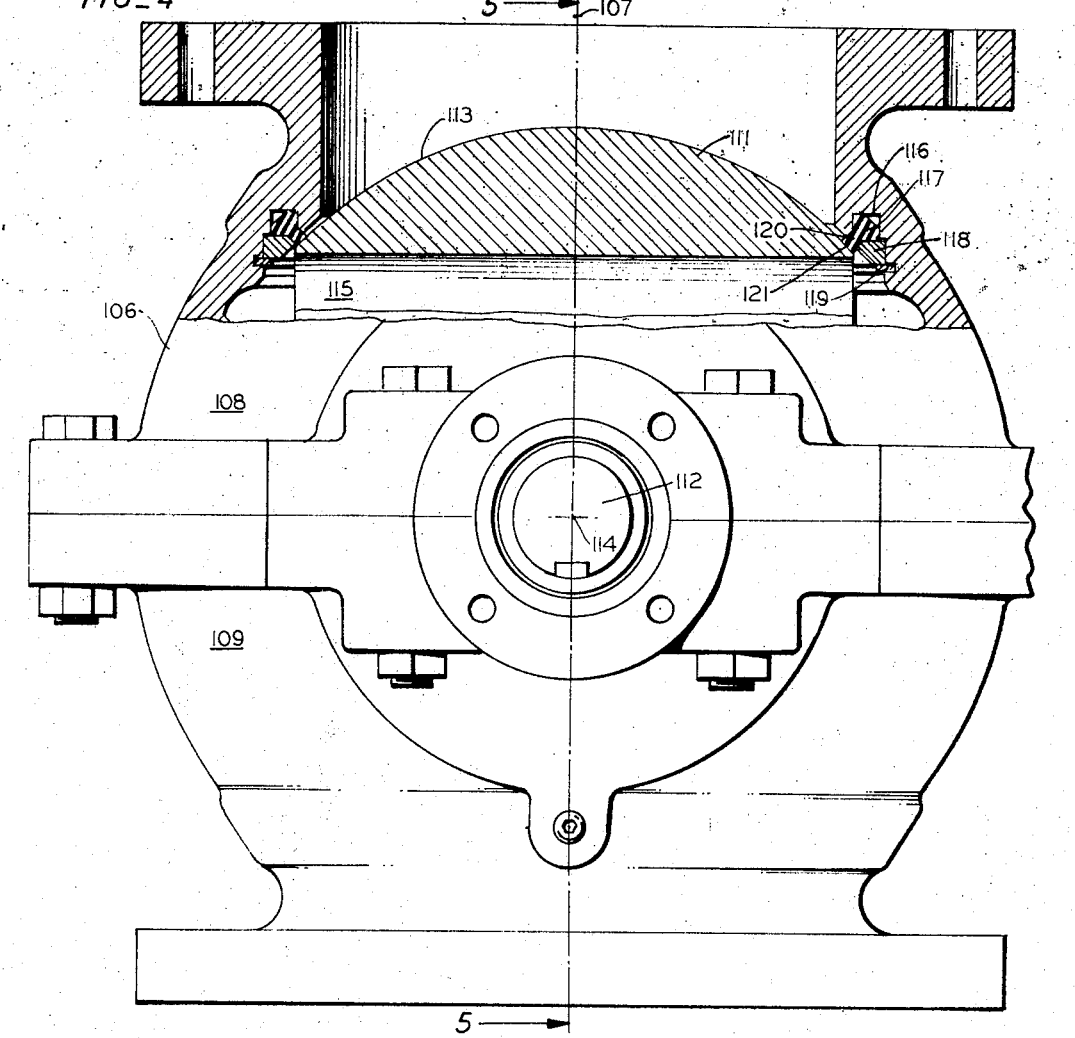
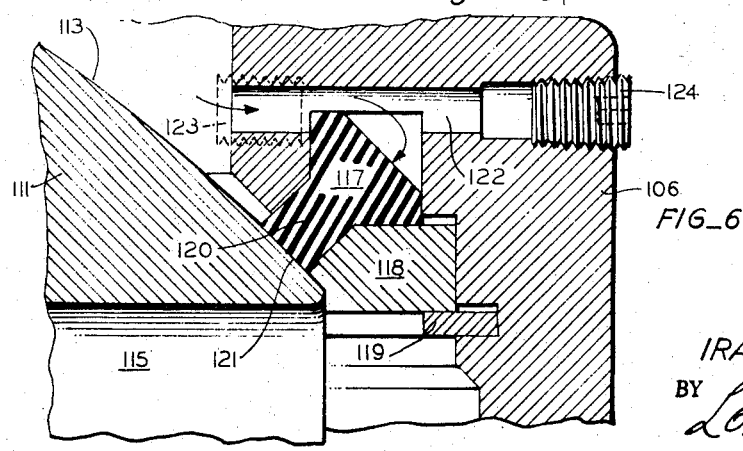
INVENTOR.
IRA MORGAN WHITE
BY Lothrop & West
ATTORNEYS

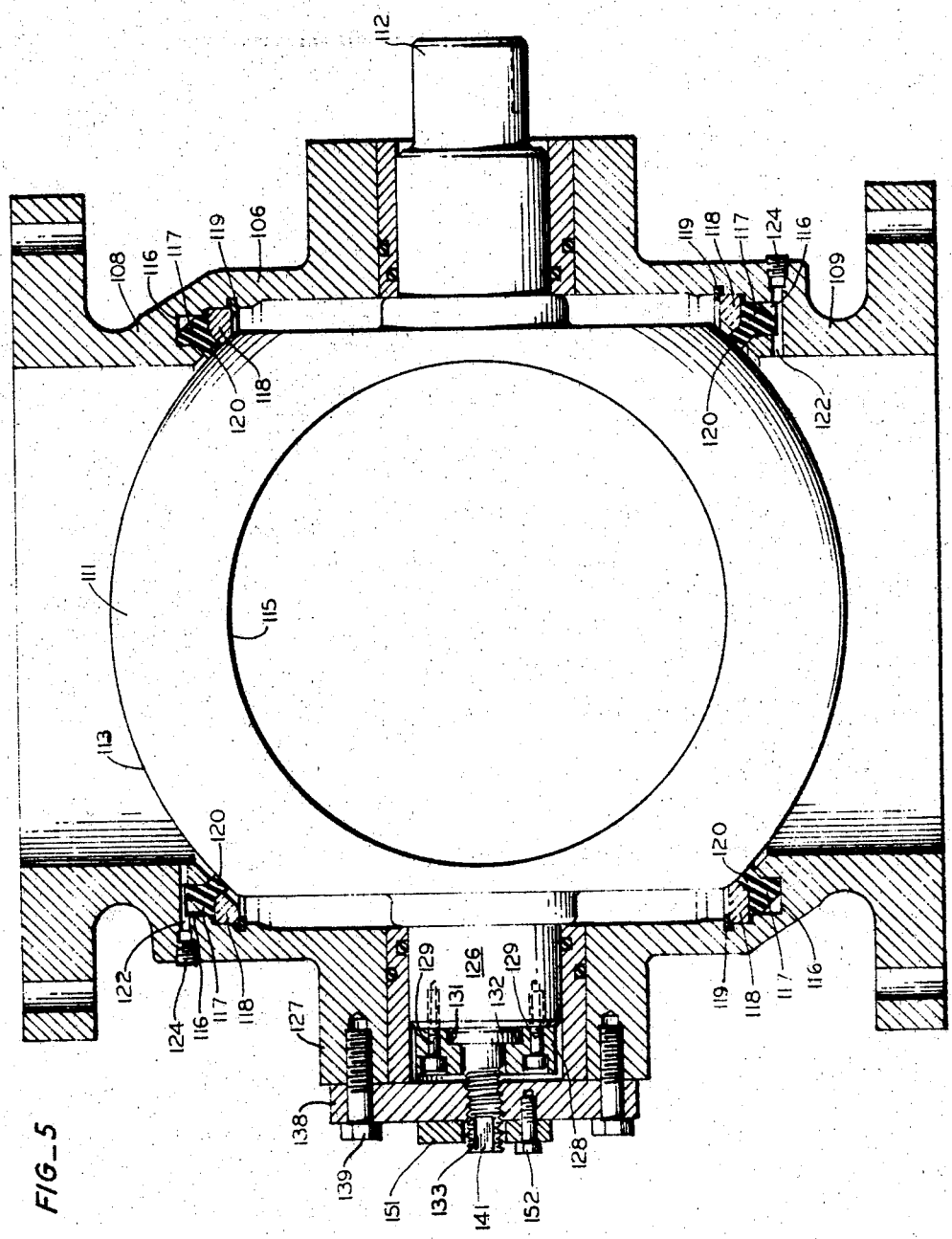

United States Patent Office 3,208,718
Patented Sept. 28, 1965

3,208,718
SPHERICAL VALVE
Ira Morgan White, Berkeley, Calif., assignor to Baldwin-Lima-Hamilton Corporation, a corporation of Pennsylvania
Filed Mar. 15, 1963, Ser. No. 265,396
4 Claims. (Cl. 251—172)

My invention relates to valves for the control of flow and is especially concerned with valves having a rotor of spherical contour or ball shape movable between one position in which a passageway through the ball rotor is in alignment with an inlet and an outlet and another position in which solid surfaces on the ball rotor span the inlet and outlet in order to block flow therebetween. Valves of this general type are well known and are very effective in many installations, but have the usual defects of valves in that it is difficult to provide a sealing arrangement effective under all conditions.

It is therefore an object of my invention to provide an improved spherical valve.

Another object of the invention is to provide a spherical valve in which the sealing means is especially constructed and arranged to afford good sealing even though the valve is utilized under adverse conditions.

A still further object of the invention is to provide a spherical valve which can readily be assembled and disassembled with the parts fitting together and operating well upon reassembly.

Another object of the invention is to provide a spherical valve in which the sealing mechanism is augmented by pressure fluid force when desired.

A still further object of the invention is to provide a spherical valve which can readily and economically be manufactured, maintained and operated.

An additional object of the invention is to provide a spherical valve effective in various different environments.

Other objects together with the foregoing are attained in the embodiments of the invention described in the accompanying description and illustrated in the accompanying drawings, in which:

FIGURE 1 is a side elevation of one form of spherical valve constructed pursuant of the invention;

FIGURE 2 is a cross section to an enlarged scale, the plane of the section being indicated by the line 2—2 of FIGURE 1;

FIGURE 3 is a considerably enlarged detail in cross section showing the sealing environment of this form of spherical valve;

FIGURE 4 is for the most part a side elevation of a modified form of spherical valve in accordance with the invention, the upper portion of the figure being broken away to disclose the interior construction in cross section on an axial plane;

FIGURE 5 is a cross section, the plane of which is indicated by the line 5—5 of FIGURE 4; and FIGURE 6 is a considerably enlarged detail showing the sealing construction of the form of valve illustrated in FIGURE 4.

While the spherical valve disclosed herein can be embodied in a number of different ways, partly depending upon the environment in which it is utilized, it has successfully been commercially incorporated, especially for use with fluids containing deleterious material. One installation has been in connection with the piping of cement slurry in a cement plant, the spherical valve being utilized to permit and cut off the slurry flow. The slurry comprises not only an aqueous medium such as water, but also includes sand and cement particles and like abrasive materials.

In the form of the invention especially shown in FIGURES 1–3 inclusive, the valve includes a housing 6 generally symmetrical about a through axis 7 and conveniently made in two parts 8 and 9. These parts abut along a normal plane and are held together by appropriate fastenings 11. The housing 6 includes an inlet 13 and an outlet 14. These are both in alignment on the axis 7 and are generally circular in cross section. They are surrounded by coupling flanges 16 and 17 so that the valve can be incorporated in other piping. The housing 6 between the inlet 13 and outlet 14 is enlarged to provide a central chamber 18 likewise generally symmetrical about the axis 7.

Designed to fit within the chamber 18 and to be disposed therein when the halves 8 and 9 are separated is a ball rotor 21. The rotor itself is generally symmetrical about a center 22 coincident with the axis 7 and includes a circular and central through passageway 23. The ball rotor is provided with trunnion extensions 24 and 26 on a cross axis 27 normal to the axis 7 and concentric with the center 22. The trunnion 24 is provided with an antifriction sleeve 28 operating in a bushing 29 within a boss 31 projecting from the housing 6, leakage being prevented by O-rings 32 and 33. A cap plate 34 closes the end of the boss 31.

Similarly, the trunnion 26 is provided with a sleeve 36 of antifriction material operating against a bushing sleeve 37 mounted in a boss 38 projecting from the housing 6 and sealed with O-rings 39 and 41. A retaining ring 42 holds the sleeves 36 and 37 in position. The trunnion 26 is sufficiently long to extend beyond the boss 38 and has a keyway 43 for engagement with any suitable operator (not shown) which can be mounted on bosses 44 on the housing 6.

The effect of the operator is to rotate the trunnions 24 and 26 and likewise the ball rotor 21 between at least two positions. In one of these positions, the passageway 23 is in substantial alignment with the inlet 13 and the outlet 14 for through flow, whereas in another position the passageway 23 is out of alignment completely with the inlet 13 and the outlet 14. In this other position the ball rotor 21 is so disposed as to put solid surfaces 47 and 48 thereon in locations to span the inlet and the outlet, thus effectively blocking them. Although they need not be, the surfaces 47 and 48 are preferably spherical, concentric with the center 22 and of a suitable, predetermined radius 49 (FIGURE 2).

In order that when it is in its blocking or closed position the valve will be tight and will not leak, special sealing means are provided. As particularly shown in FIGURE 3, the ball rotor 21 has a stepped portion to afford a ring surface 51 normal to the rotor axis and a cylindrical surface 52 concentric with the rotor axis. Resting against the surfaces 51 and 52 is a seat ring 53, preferably an annulus of special material which can readily be given a spherical outer surface 54 concentric with the center 22 and quite resistant to abrasion and wear. The spherical surface 54 is preferably at a radius 56 substantially greater than the radius 49. The ring 53 is held in place by a number of removable cap screws 57 engaging the rotor and countersunk into the ring 53. An O-ring 58 recessed in the ball rotor effectively seals against leakage between the seat ring 53 and the remainder of the body of the ball rotor. It is preferred to make the major portion of the ball rotor of material otherwise suitable for the purpose and to provide the separate ring 53 of especially abrasive and wear resistant material.

To cooperate with the seating ring 53, there is provided a special sealing mechanism. For this purpose, the housing 6 between the inlet and the central chamber 18 and the outlet 14 and the central chamber 18 is provided with identical structures so that the description of one applies equally to the other. Within the housing there is provided a normal surface 61 perpendicular to the axis 7 and a cylindrical surface 62 concentric with the axis 7. Disposed to abut the surfaces 61 and 62 is a base ring 63 having an inner bore 64 of substantially the same diameter as the adjacent flow passage. The axial dimension of the ring 63 is not as great as the depth of the cylindrical surface 62 so as to accommodate a closure ring 66. The axial size of the closure ring with respect to the base ring 63 is such that under normal conditions a clearance gap 67 exists therebetween. The closure ring 66 is held against dislodgment by a locking ring 68 disposed in a channel 69 cut deeply into the housing 6.

When the base ring 63 and the closure ring 66 are both in position, they can be considered as part of the housing 6 and together define a housing groove 71. The groove itself has an end wall 72 normal to the axis 7 and an inner cylindrical wall 73 concentric with the axis 7 as well as an outer cylindrical wall 74 likewise concentric with the axis 7. The ring 66 has an end wall 75 normal to the axis 7. Both rings have tapered walls 76 and 77, respectively. The walls 73 and 75 do not meet each other, but rather are terminated to afford an angular or conical wall 78 on the base ring 63 and a similar conical wall 79 on the closure ring 66. The two walls 78 and 79 are both concentric with the axis 7 and are substantially conical in the sense that they are both short frusta of concentric cones. The surfaces 78 and 79 in an ideal case both intersect at the center 22, although in a practical instance the conical elements as represented in FIGURE 3 can be substantially parallel since they are so short.

Since both the ring 63 and the ring 66 end in angular surfaces 76a and 77a spaced a substantial distance outside of the radius 49, an appropriate sealing member is provided. For the most part disposed within the groove 71 is an elastomeric sealing ring 81 having appropriate walls abutting the corresponding adjacent walls of the groove and terminating at one end in an angular wall 82 to leave a compartment 83 in the groove. The remaining part of the sealing ring 81 is an extension 84 having its side walls abutting the conical walls 78 and 79 and terminating in an end wall 86 which is substantially spherical and closely abuts the spherical surface 54. Since the ring 81 is made of an elastomer, its precise configurations when initially molded or formed need not be exactly those of the accommodating groove and ball rotor, but when installed the sealing ring takes on the characteristic shape of its surroundings. Any distortion of the elastomeric sealing ring upon installation reduces slightly the size of the compartment 83 and produces some bulging of the projecting portion 84. The effect of this partial confinement and distortion of the sealing ring 81 when it is installed provides some extrusion so that there is a radially inward force effective upon the projection 84 so that the surface 86 is urged into firm abutment with the adjacent sealing ring on the ball rotor. This pressure, however, is normally not so great as to afford a substantial frictional resistance to the rotation of the ball rotor. Also, the confined ring 81 helps hold the rings 63 and 68 urged apart against the wall 61 and the ring 68.

While in many instances the forces inherent in the construction itself as so far described are adequate, means are provided for use in other instances for augmenting the radially inward seal pressure. In those cases the compartment 83 is connected to the inlet 13 of the valve by a passageway 89 so that when the valve is closed and there is a substantial pressure in the inlet thereof, that pressure is transmitted to the chamber 83 and is effective upon the truncated portion of the sealing ring so as to urge the ring with even greater force toward the ball rotor. Since the two ends of the ball valve are substantially symmetrical, either end can be utilized as an inlet in any installation. The passage 89 is surplusage in the outlet of the valve, and in fact in some instances the entire sealing and seating mechanism is omitted from the downstream end of the valve, yet if an outlet or downstream sealing ring is included it serves as an extra or secondary seal even though the passage 89 is not subjected to particular pressure.

With the arrangement as described, it has been found in severe service that the valve begins and remains quite tight despite the abrasive and wearing character of fluent materials passing it.

In the form of construction shown particularly in FIGURES 4-6 inclusive, the construction in some respects is simplified. In this arrangement the valve housing 106 is also symmetrical about an axis 107 and is made in two portions 108 and 109. A rotor 111 within the housing is revolved by a supporting shaft 112 that can be provided with a suitable operator (not shown). The ball rotor 111 does not have any separate seating ring, but rather is a continuous spherical surface 113 concentric with a center 114 except for interruptions provided by a through passage 115.

The housing 106 at one end surrounding the inlet and also, if desired, at the other end surrounding the outlet is provided with a reentrant groove 116 in which an elastomeric sealing ring 117 is disposed. This ring and the contour of the groove 116 correspond almost exactly with the arrangement of FIGURE 3, except that the groove in this instance is formed directly in the valve housing rather than being indirectly formed therein. There is a separate backing ring 118 also seated in the groove and held by a retaining ring 119. The same general cross sectional contour is provided so that an extension 120 on the sealing ring 117 has a spherical surface 121 in direct abutment with the spherical surface 113 when the valve is in its closed position.

In this instance there is a passageway 122 communicating with the inlet so as to provide fluid pressure against the sealing ring 117 from within the valve. In some instances the passageway 122 is blocked on the interior end by a plug 123 (shown in dotted lines) and a plug 124 which normally is in position in the housing is then removed. When it is not desired to utilize the interior fluid for pressure purposes, the plug 124 is replaced by a connection to a source of external fluid under pressure. In an installation for handling cement slurry, for example, it is desired not to subject the sealing ring 117 to the abrasive nature of the cement slurry. Rather, the passageway 122 is plugged interiorly and is exteriorly connected to a source of relatively pure water under pressure. The function and mode of operation of this form of structure are substantially the same as those described in connection with the other embodiment of the invention.

In this modification, furthermore, there is provided an adjustment of the lateral or transverse position of the valve rotor. One of the rotor trunnions 126 terminates short of the end of the surrounding boss 127 and is provided with a cap 128 held in place by removable fastenings 129. The cap has an interior recess 131 in which is disposed the head 132 of a special bolt 133. The bolt is threaded into a closure plate 138 held on the end of the boss 127 by removable fastenings 139. The projecting end of the bolt 133 is formed with diametrically opposite flats 141 thereon. In order to move the rotor along the transverse axis in either direction, a wrench is engaged with the flats 141 and bolt 133 is appropriately turned. The head 132 of the bolt thus causes a corresponding traverse of the ball rotor. When the rotor is appropriately positioned, the bolt is locked in position by a keeper 151 held in place on the closure plate 138 by a cap screw 152. When this adjustment is utilized, it is possible to position the ball rotor in a lateral direction precisely with respect to the sealing rings.

What is claimed is:
1. A spherical valve comprising a housing having a central chamber communicating with a flow passage, a ball rotor having a passageway therethrough and having a solid surface thereon, means for mounting said ball rotor in said chamber for rotation between one position with said passageway connecting with said flow passage and another position with said solid surface spanning said flow passage, a base ring and a closure ring mounted in said housing and spaced apart to leave a gap and forming a groove surrounding said flow passage, said rings defining the shape of said groove to provide a chamber portion remote from said ball rotor and having a predetermined width and to provide a conical channel portion narrower than said chamber portion and extending radially of said ball rotor between said chamber portion and said central chamber, means in said base ring defining a pressure passage to a remote part of said chamber portion, a conical elastomeric sealing ring in said groove and engaging said ball rotor, said sealing ring being of larger free cross section than said channel and of larger free cross section than said chamber portion except for said remote part thereof and urging said base ring and said closure ring apart to enlarge said gap, and means in said housing and engaging said closure ring for limiting the size of said gap.

2. A spherical valve as in claim 1 in which said elastomeric sealing ring has a substantially conical shape with parallel side faces terminating at the spherical surface of said ball rotor.

3. A spherical valve as in claim 1 in which said elastomeric sealing ring has a substantially conical shape and when confined between said base ring and said closure ring is extruded along said channel and against the spherical surface of said ball rotor.

4. A spherical valve as in claim 1 in which said elastomeric sealing ring has sharp substantially right angle corners adjacent the spherical surface of said ball rotor.

References Cited by the Examiner
UNITED STATES PATENTS

| | | | |
|---|---|---|---|
| 2,151,442 | 3/39 | Roberts et al. | 251-172 |
| 2,861,771 | 11/58 | Bryant | 251-174 XR |
| 2,868,497 | 1/59 | Graham | 251-174 XR |
| 2,940,725 | 6/60 | Nagel | 251-317 XR |
| 2,965,354 | 12/60 | Grove et al. | 251-173 |
| 3,079,124 | 2/63 | Fawkes | 251-317 |
| 3,109,623 | 11/63 | Bryant | 251-174 XR |
| 3,114,386 | 12/63 | Dumm | 251-174 XR |
| 3,131,906 | 5/64 | King | 251-317 XR |

FOREIGN PATENTS 256,919    3/49    Switzerland.

LAVERNE D. GEIGER, *Primary Examiner.*